(12) United States Patent
Hayes et al.

(10) Patent No.: US 11,625,633 B2
(45) Date of Patent: Apr. 11, 2023

(54) MACHINE LEARNING TO MONITOR OPERATIONS OF A DEVICE (71) Applicants: Charles Ethan Hayes, Holly Springs, MD (US); Ann M. Pitruzzello, Chapel Hill, MD (US); Matthew Lee Welborn, Cary, NC (US); Macey C. Ruble, Fuquay Varina, NC (US); Peter D. Anderson, Baltimore, MD (US)

(72) Inventors: Charles Ethan Hayes, Holly Springs, MD (US); Ann M. Pitruzzello, Chapel Hill, MD (US); Matthew Lee Welborn, Cary, NC (US); Macey C. Ruble, Fuquay Varina, NC (US); Peter D. Anderson, Baltimore, MD (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 364 days.

(21) Appl. No.: 16/882,980

(22) Filed: May 26, 2020

(65) Prior Publication Data
US 2021/0374580 A1 Dec. 2, 2021

(51) Int. Cl.
G06F 21/00 (2013.01)
G06N 7/00 (2023.01)
G06N 20/00 (2019.01)
G06F 21/56 (2013.01)

(52) U.S. Cl.
CPC ............. G06N 7/005 (2013.01); G06F 21/56 (2013.01); G06N 20/00 (2019.01)

(58) Field of Classification Search
CPC ......... G06F 21/56; G06N 20/00; G06N 7/005

USPC .......................................................... 706/12
See application file for complete search history.

(56) References Cited

U.S. PATENT DOCUMENTS

| | | | |
|---|---|---|---|
| 8,874,916 B2 | 10/2014 | Smith et al. | |
| 8,901,916 B2 | 12/2014 | Jones et al. | |
| 9,602,058 B1* | 3/2017 | Li | ............. H03F 3/245 |
| 10,536,857 B1* | 1/2020 | Sloane | .................. H04W 12/61 |
| 10,649,449 B2* | 5/2020 | Bell | ...................... G05B 23/024 |
| 2014/0095876 A1 | 4/2014 | Smith et al. | |
| 2015/0012737 A1 | 1/2015 | Newell | |
| 2016/0098561 A1 | 4/2016 | Keller et al. | |
| 2017/0076198 A1* | 3/2017 | Jin | ............................ G06N 3/08 |
| 2017/0102694 A1* | 4/2017 | Enver | .................. G06Q 10/063 |
| 2017/0329943 A1 | 11/2017 | Choi et al. | |

(Continued)

OTHER PUBLICATIONS

Non Final Office Action for U.S. Appl. No. 16/425,614 dated May 7, 2021.

(Continued)

Primary Examiner — Josnel Jeudy
(74) Attorney, Agent, or Firm — Tarolli, Sundheim, Covell & Tummino LP (57) ABSTRACT A multi-tier machine learning engine receives signal data characterizing a monitored signal of the computing platform. The machine learning engine can include a plurality of tiers that employ frequency domain analysis on the signal data to identify an application executing on the computing platform and a module and/or loop of the identified application and employ time domain analysis on the signal data to identify timing of events within the identified module and/or loop of the identified application.

19 Claims, 7 Drawing Sheets

(56) References Cited

U.S. PATENT DOCUMENTS

| | | |
|---|---|---|
| 2018/0012020 A1 | 1/2018 | Prvulovic et al. |
| 2018/0041341 A1 | 2/2018 | Gulati |
| 2019/0020494 A1 | 1/2019 | Roosli |
| 2019/0279744 A1* | 9/2019 | Howley .............. G16H 20/60 |
| 2020/0126126 A1* | 4/2020 | Briancon ............ G06K 9/6267 |
| 2020/0184036 A1* | 6/2020 | Wu ...................... G06F 21/62 |
| 2020/0358819 A1* | 11/2020 | Bowditch ............ G06K 9/6267 |
| 2020/0396148 A1* | 12/2020 | Schibler ............. G06F 9/45558 |

OTHER PUBLICATIONS

Han et al.: "Watch Me, but Don't Touch Me! Contactless Control Flow Monitoring via Electromagnetic Emanations"; arXiv:1708.09099v1 [cs.CR] Aug. 30, 2017; pp. 1-14.

Khan, et al.: "Detailed Tracking of Program Control Flow Using Analog Side-Channel Signals: A Promise for IoT Malware Detection and a Threat for Many Cryptographic Implementations"; ResearchGate, Conference Paper—Apr. 2018; DOI: 10.1117/12.2304382; pp. 301-315.

Liu et al.: "On Code Execution Tracking via Power Side-Channel", CCS'16, Oct. 24-28, 2016, Vienna, Austria; DOI: http://dx.doi.org/10.1145/2976749.2978299; pp. 1019-1031.

Nazari, et al.: "EDDIE: EM-Based Detection of Deviations in Program Execution"; ISCA '17, Jun. 24-28, 2017, Toronto, ON, Canada; https://doi.org/10.1145/3079856.3080223; pp. 333-346.

Ruble, et al.: "Hyperdimensional Bayesian Time Mapping (HyperBaT): A Probabilistic Approach to Time Series Mapping of Non-Identical Sequences"; IEEE Transactions on Signal Processing, vol. 67, No. 14, Jul. 15, 2019; pp. 3719-3731.

Sehatbakhsh, et al.: "Syndrome: Spectral Analysis for Anomaly Detection on Medical IoT and Embedded Devices"; IEEE 978-1-5386-4731-8/18; International Symposium on Hardware Oriented Security and Trust (HOST); pp. 1-8.

Agrawal, et al.: "Casper: An efficient approach to detect anomalous code execution from unintended electronic device emissions"; Downloaded From: https://www.spiedigitallibrary.org/conference-proceedings-of-spie on Jan. 20, 2020 Terms of Use: https://www.spiedigitallibrary.org/terms-of-use.

Non Final Office Action for U.S. Appl. No. 16/359,744 dated Dec. 16, 2020.

* cited by examiner

MACHINE LEARNING TO MONITOR OPERATIONS OF A DEVICE

TECHNICAL FIELD

The present disclosure relates to employing machine learning to monitor operations of a computing platform.

BACKGROUND

The Internet of things (IoT) is a system of interrelated computing devices, mechanical and digital machines that are provided with unique identifiers (UIDs) and the ability to transfer data over a network without requiring human-to-human or human-to-computer interaction. The definition of the IoT has evolved due to the convergence of multiple technologies, real-time analytics, machine learning, commodity sensors and embedded systems. Fields of embedded systems, wireless sensor networks, control systems, automation (including home and building automation) and others all contribute to enabling the IoT. In the consumer market, IoT technology is most synonymous with products pertaining to the concept of the "smart devices", covering devices and appliances (such as lighting fixtures, thermostats, home security systems and cameras, and other home appliances) that support one or more common ecosystems, and can be controlled via devices associated with that ecosystem, such as smartphones and smart speakers.

An air gap, air wall or air gapping is a network security measure employed on one or more computers to ensure that a secure computer network is physically isolated from unsecured networks, such as the public Internet or an unsecured local area network. Air gapping between two computing platforms indicates that the two computing platforms do not communicate directly or indirectly through a network, with a physical or logical air gap, analogous to the air gap used in plumbing to maintain water quality.

SUMMARY

One example relates to a system for monitoring operations of a computing platform. The system can include a non-transitory memory for storing machine readable instructions and a processing unit that accesses the memory and executes the machine readable instructions. The machine readable instructions can include a multi-tier machine learning engine that receives signal data characterizing a monitored signal of the computing platform. The machine learning engine can include a plurality of tiers that employ frequency domain analysis on the signal data to identify an application executing on the computing platform and a module and/or loop of the identified application and employ time domain analysis on the signal data to identify timing of events within the identified module and/or loop of the identified application.

Another example relates to a non-transitory machine readable medium having machine executable instructions. The machine executable instructions can include a hierarchical dynamic Bayesian network (DBN) that receives signal data characterizing a monitored signal of the computing platform and an interference signal. The hierarchical DBN can include a first tier that employs frequency domain analysis on the signal data to identify an application executing on the computing platform and a second tier that employs frequency domain analysis on the signal data to identify a module and/or loop of the identified application. The machine learning engine can also include a third tier that employs time domain analysis on the signal data to identify timing of events within the identified module and/or loop of the identified application. The machine learning engine can still further include a fourth tier that employs the identified timing of the events to determine control flow paths being executed by the computing platform. The first tier, the second tier and the third tier each include operations to curtail the interference signal from the signal data.

Yet another example relates to a method that can include receiving, at a multi-tier machine learning engine, signal data characterizing a monitored signal of the computing platform and an interference signal. The method can also include preprocessing, by a plurality of tiers of the multi-tier machine learning engine, the signal data. The method can further include executing frequency domain analysis on the signal data to identify a module and/or loop of an identified application executing on the computing platform and identifying timing of events within an identified module and/or loop of the identified application.

DETAILED DESCRIPTION

This disclosure relates to systems and methods for implementing a modular machine learning system that leverages samples of a monitored signal, such as radio frequency (RF) emanations from one or more electronic devices to determine the state of operations of the one or more devices. The system includes a reconfigurable machine learning framework to extract desired information from the one or more devices.

More particularly, the system described herein provides a unified approach for leveraging emanations from electronic devices for a variety of purposes. For example, when a processor (or other computing platform) is running, electrons move through a conductive medium. This produces an intermittent electromagnetic field, which generates RF emissions. The system can measure these emissions and employ techniques such as machine learning to identify the processes that led to the recorded emissions to predict the state of the one or more devices.

Figure 1:
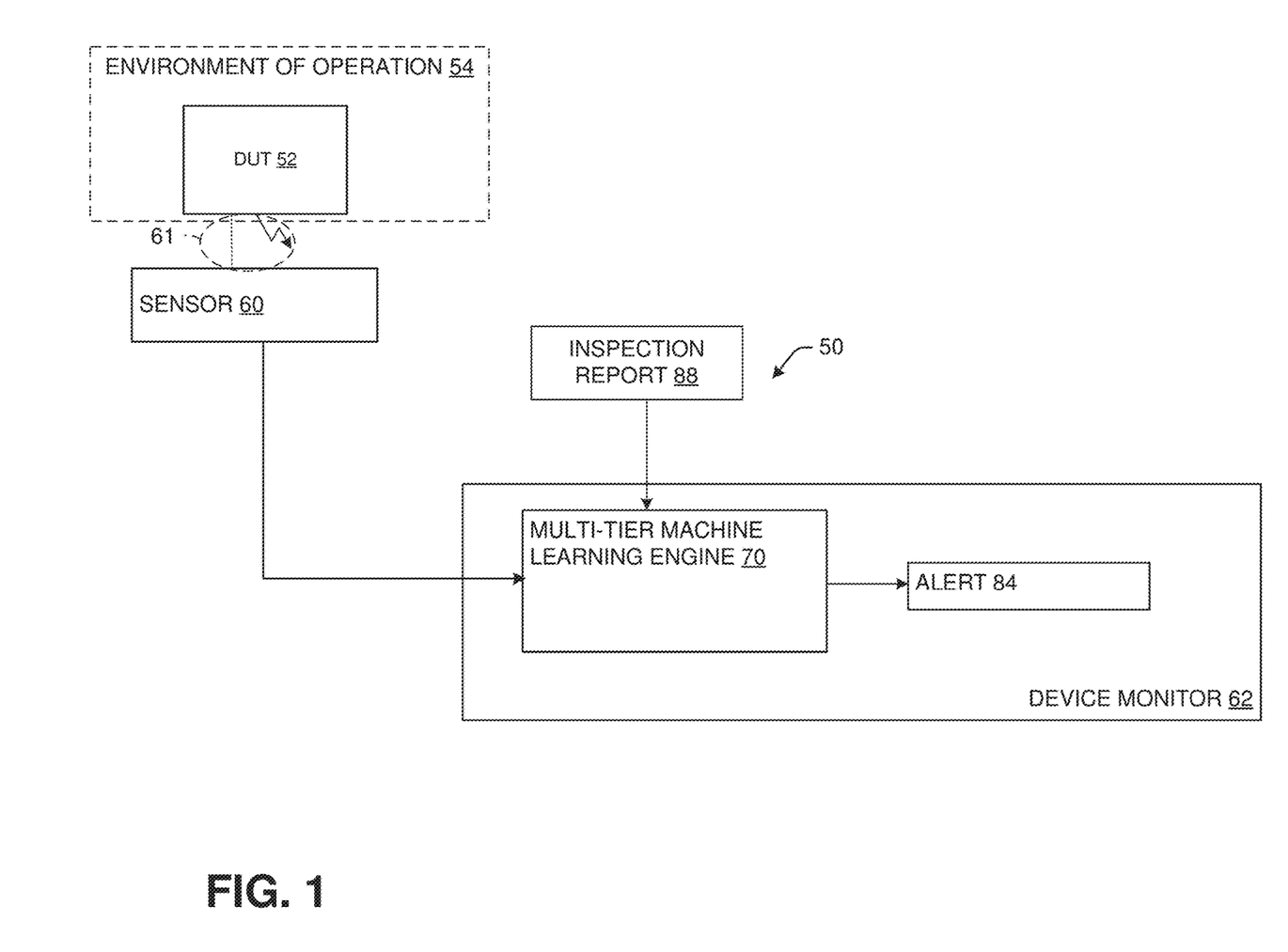
FIG. 1 illustrates a block diagram of a system for monitoring operations of a device under test (DUT).

FIG. 1 illustrates a block diagram of a system 50 that can monitor a computing platform, which can be referred to as a device under test (DUT) 52. The DUT 52 can be implemented, for example, as an Internet of Things (IoT) device or a field programmable gate array (FPGA). In examples where the DUT 52 is implemented as an IoT device, the DUT 52 can include a memory for storing machine readable instructions and processing unit for accessing the memory of the DUT 52 and executing the machine readable instructions.

The DUT 52 can be installed in an environment of operation 54. The environment of operation 54 can be representative of the context in which the DUT 52 is designed to operate. As one example, the DUT 52 could represent a controller for an unmanned vehicle. In such a situation, the environment of operation 54 could represent other components in the unmanned vehicle. In other examples, the DUT 52 could be an interface or controller for a home appliance, such as a thermostat, a refrigerator or a dish washer.

As noted, the DUT 52 executes machine readable instructions. Execution of such machine readable instructions causes current to flow throughout circuitry of the DUT 52. Current flowing through the circuitry causes electrons to move through a conductive medium, which produces an intermittent electromagnetic field that generates Radio frequency (RF) emissions. Additionally, in some examples, the DUT 52 can consume a changing amount of power which can also produce detectable RF signatures.

A sensor 60 can be configured to sample a monitored signal 61 associated with the DUT 52. The monitored signal 61 can represent RF emissions or a changing consumption of power by the DUT 52. Thus, in some examples, the sensor 60 can be implemented as an antenna, and in other examples, the sensor 60 can be implemented as a power meter. In either situation, the sensor 60 can provide data (e.g., raw data) representing the monitored signal 61 (e.g., RF emissions or power consumed) to a device monitor 62, which data can be referred to as signal data or as the monitored signal 61. The device monitor 62 can be implemented as a computing platform, such as a server, a workstation, a laptop computer, a tablet computer or a hand-held computing device (e.g., smartphone). Thus, the device monitor 62 can include a non-transitory memory for storing machine readable instructions and a processing unit (e.g., one or more processor cores) that accesses the memory and executes the machine readable instructions.

The device monitor 62 can be air-gapped from the DUT 52. As used herein, the term "air-gapped" refers to a logical and physical separation of the DUT 52 from the sensor 60 and the device monitor 62, such that an air wall or air gapping separates the DUT 52 from the sensor 60 and the device monitor 62 is physically isolated from the DUT 52.

The device monitor 62 can include a multi-tier machine learning engine 70 programmed to identify correlations in the monitored signal with known processes. The identification of the correlations with the known processes allows the multi-tier machine learning engine 70 to monitor real-time changes in patterns of the monitored signal to determine whether the DUT 52 is operating properly or whether the DUT 52 is potentially executing unauthorized code, such as malicious code (e.g., a virus, malware and/or a denial of service (DoS) attack).

Other components of the environment of operation 54, including, but not limited to external electrical components, can induce interference that is included in the monitored signal 61. Thus, every tier of the multi-tier machine learning engine 70 (or some subset thereof) can each include operations (e.g., filtering operations) to curtail the interference present in the monitored signal 61. As one example one or more tiers of the multi-tier machine learning engine can include a signal preconditioning operation, a signal whitening operation and/or other noise canceling operations to curtail the impact of the interference in the monitored signal 61.

The multi-tier machine learning engine 70 can be implemented, for example, as a hierarchical Dynamic Bayesian Network (DBN). The multi-tier machine learning engine 70 can operate in multiple domains of time and frequency. More particularly, different tiers of the multi-tier machine learning engine 70 can focus on one of the time domain, for instance by using Hyperdimensional Bayesian Time Mapping (HyperBaT), the frequency domain with spectral analysis such as short-time Fourier transform (STFT), or a hybrid time/frequency domain approach such as an average magnitude difference function (AMDF), to produce a model-based machine learning framework for exploiting measurements in the monitored signal 61, which can correspond to RF emanations or power consumption by the DUT 52.

In some examples, as noted, the multi-tier machine learning engine 70 is implemented as a hierarchical DBN to evaluate the monitored signal 61 associated with the DUT 52. In some examples, the multi-tier machine learning engine 70 has four tiers, but in other examples, there could be more or less tiers. The four tiers operate in concert to detect the state of the DUT 52 while the DUT 52 executes code. Each tier in the multi-tier machine learning engine 70 executes a different machine learning algorithm. In examples where the multi-tier machine learning engine 70 is implemented as a hierarchical DBN, each tier executes a different DBN. Moreover, data is passed between the tiers to reinforce and/or adapt to changing conditions.

Prior to monitoring the monitored signal 61, the tiers of the multi-tier machine learning engine 70 is trained with sample data of a measured signal from a test device. This data can be unlabeled, partially-labeled, or labeled. The test device has the same hardware as the DUT 52. In some examples, the test device is the DUT 52, and in other examples, the DUT 52 can be a clone of the test device.

During training, the test device executes authorized code, and the monitored signal is sampled. As used herein, the term "authorized code" refers to any application, module and/or sub-module that has been authorized for execution by the test device and the DUT 52. The authorized code includes machine readable instructions for executing expected operations of the test device and DUT 52. Examples of authorized code include an operating system, original embedded code, validated applications, etc. In some examples, during training, the monitored signal can be sampled during times that the test device executes specific instances of unauthorized code. This allows the system to identify particular intrusions, rather than reporting in a binary manner of "authorized" or "unauthorized" code execution. As used herein, the term "unauthorized code" represents any application (e.g., program), module or sub-module that has not been authorized to execute on the DUT 52. Examples of unauthorized code include, but are not limited to viruses, malware, denial of service (DoS) attacks, etc. Stated differently, the multi-tier machine learning engine 70 is trained with authorized code and can be trained with unauthorized code to allow the multi-tier machine learning engine 70 to recognize both.

More particularly, the multi-tier machine learning engine 70 include a first tier that employs basic computation on frequency domain measurements to predict what application the DUT 52 is executing. The multi-tier machine learning engine 70 also includes a second tier programmed to employ the knowledge of the application from the first tier and combines this knowledge with frequency domain measurements to predict which module/loop of the application is executed by the DUT 52. The multi-tier machine learning engine 70 further includes a third tier that executes time-domain analysis to leverage repetition in the time domain measurements of the monitored signal 61 from the DUT 52 to predict a relatively precise timing of events within each module/loop of the programing being executed by the DUT 52. Further still, the multi-tier machine learning engine 70 includes a fourth tier that executes additional time-domain analysis on the identified application, the module/loop of the application and the predicted timing of events to determine the precise control flow paths being executed by the DUT 52.

It is understood that although the example of the multi-tier machine learning engine 70 is described as having four tiers, there are other possible example implementations. For instance, some example implementations could employ two or three tiers. Other example implementations could employ five or more tiers. The tiers of the multi-tier machine learning engine 70 can be trained independently, such that each tier operates as a swappable module that can be replaced and/or adjusted as machine learning algorithms continue to evolve. In such a situation, changes to one such tier do not inherently impact another tier.

The multi-tier machine learning engine 70 can evaluate the results of each of the first tier, the second tier, the third tier and the fourth tier (or some subset or superset thereof) to evaluate the state of the DUT 52 to predict if the DUT 52 is executing unauthorized code. In some situations, the multi-tier machine learning engine 70 can be programmed to determine that the DUT 52 is potentially executing unauthorized code in response to determining that the determined control flow paths being executed by the DUT 52 deviates from an expected pattern by more than a threshold level. In response to predicting that the DUT 52 is executing unauthorized code, the multi-tier machine learning engine 70 can generate an alert 84 that uniquely identifies the DUT 52 and the predicted unauthorized code. In some examples, the multi-tier machine learning engine 70 is able to identify the unauthorized code that is potentially executing on the DUT 52. In other examples, the multi-tier machine learning engine 70 determines that the unauthorized code is unrecognized.

In some examples, the alert 84 can be provided to an external system (e.g., via a network) to inform a user that the DUT 52 is potentially executing unauthorized code. In response, the user can inspect the DUT 52 and take corrective action, if necessary. Such corrective action can include, but is not limited to removing the DUT 52 from the environment of operation 54, clearing a memory of the DUT 52 and/or reinstalling authorized code, etc.

Furthermore, in some examples, the user can generate an inspection report 88 that characterizes observations and/or corrective action taken by the user. In some examples, the inspection report 88 may include information that identifies a type of unauthorized code (e.g., virus, malware or DoS attack). Additionally, in some situations, the inspection report 88 could include information indicating that no unauthorized code was detected on the DUT 52. The inspection report 88 can be provided to the multi-tier machine learning engine 70 and used as feedback to improve the accuracy of the multi-tier machine learning engine 70. For example, if the multi-tier machine learning engine 70 predicts that the DUT 52 is executing unauthorized code, but the inspection report 88 indicates that the DUT 52 is only executing authorized code, the multi-tier machine learning engine 70 can adjust weights and/or parameters within the multi-tier machine learning engine 70 to reflect the results indicated in the inspection report 88.

Over time, statistical models employed by the multi-tier machine learning engine 70 can be adapted for specific scenarios or adjusted for known alterations. For instance, in situations where the monitored signal 61 represents RF emissions, the RF emissions may be shifted in frequency based on a processor clock speed of the DUT 52 changing over time. However, the statistical models employed by multi-tier machine learning engine 70 can estimate the clock speed and then shift the modeled spectrum appropriately.

Accordingly, the device monitor 62 can monitor operations on the DUT 52 without directly communicating with the DUT 52 (e.g., air gapped). Additionally, because the multi-tier machine learning engine 70 includes the operations to curtail interference present in the monitored signal 61, the multi-tier machine learning engine 70 can accurately monitor operations of the DUT 52 when the DUT 52 is executing in a production environment without the need for external shielding.

Figure 2:
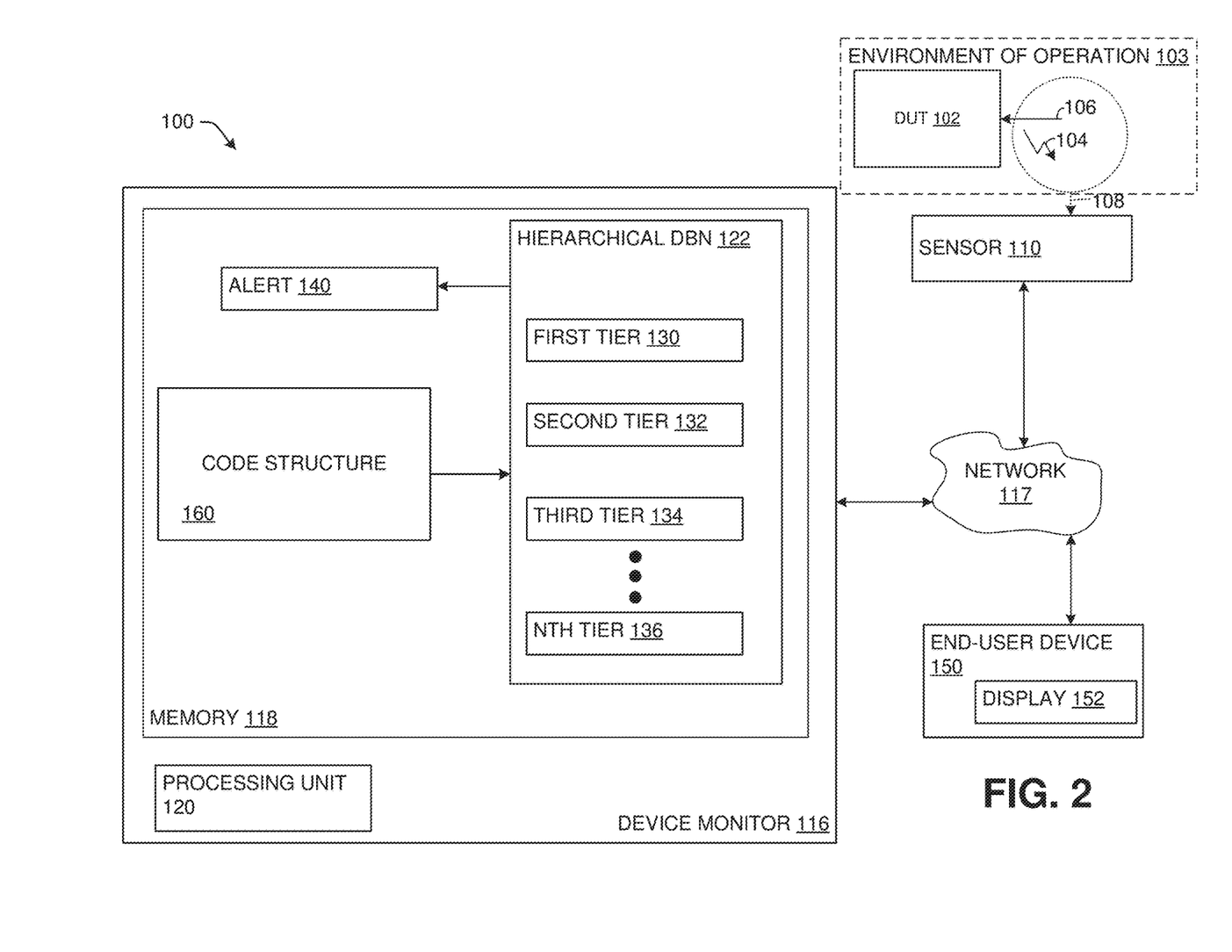
FIG. 2 illustrates another block diagram of a system for monitoring operations of a DUT.

FIG. 2 illustrates a block diagram of another system 100 that can monitor a computing platform, which can be referred to as a DUT 102. The system 100 can be employed to implement the system 50 of FIG. 1. In some examples, the DUT 102 is an IoT device or an FPGA. In examples where the DUT 102 is implemented as an IoT device, the DUT 102 can include a memory for storing machine readable instructions and a processing unit for accessing the memory of the DUT 102 and executing the machine readable instructions.

The DUT 102 can be installed in an environment of operation 103. The environment of operation 103 can be representative of the context in which the DUT 102 is designed to operate. In one example, the DUT 102 can represent a controller or interface for a smart home appliance, such as a smart thermostat, a smart refrigerator or a smart washing machine. In this situation, the environment of operation 103 could represent other components of the smart home appliance. In other examples, the DUT 102 could represent a controller for an unmanned vehicle, such as a terrestrial vehicle or an aircraft. In such a situation, the environment of operation 103 could represent other components in the unmanned vehicle.

As noted, the DUT 102 executes machine readable instructions. Execution of such machine readable instructions causes current to flow throughout circuitry of the DUT 102. Current flowing through the circuitry causes electrons move through a conductive medium, which produces an intermittent electromagnetic field that generates RF emissions represented as 104. Additionally, in some examples, the DUT 102 can consume a changing amount of power within a power signal 106.

A sensor 110 can be configured to detect the RF emissions 104 or the changing consumption of the power signal 106 by the DUT 102 corresponding to a monitored signal 108. Thus, in some examples, the sensor 110 can be implemented as an antenna. In other examples, the sensor 110 can be implemented as a power meter. In either situation, the sensor 110 can provide data (e.g., raw data) representing the monitored signal 108 (e.g., RF emissions or power consumed) to a device monitor 116. In some examples, the sensor 110 can provide data characterizing the monitored signal 108 to the device monitor 116 directly. In other examples, the sensor 110 can provide the device monitor 116 with the data characterizing the monitored signal 108 via a network 117. The network 117 can be implemented as a public network (e.g., the Internet), a private network (e.g., a local area network) or a combination thereof (e.g., a virtual private network.

The device monitor 116 can be implemented as a computing platform, such as a server, a workstation, a laptop computer, a tablet computer or a hand-held computing device (e.g., smartphone). Thus, the device monitor 116 can include non-transitory memory 118 that can store machine readable instructions. The non-transitory machine readable memory 118 can be implemented, for example, as volatile or nonvolatile random access memory (RAM), such as flash memory, a hard-disk drive, a solid state drive or a combination thereof. The processing unit 120 (e.g., one or more processor cores) can access the memory 118 and execute the machine-readable instructions.

The device monitor 116 can be air-gapped from the DUT 102. Thus, the sensor 110 and the device monitor 116 is both logically and physically separated from the DUT 102. The memory 118 can include framework for a hierarchical DBN 122 that can be employed to implement the multi-tier machine learning engine 70 of FIG. 1. The hierarchical DBN 122 can be programmed to identify correlations in the monitored signal 108 with known processes. The identification of the correlations with the known processes allows the hierarchical DBN 122 to monitor real-time changes in patterns of the monitored signal 108 to determine whether the DUT 102 is operating properly or whether the DUT 102 is potentially executing an unauthorized operation, such as malicious code (e.g., a virus, malware or a DoS attack). Similarly, the identification of the correlations with the known processes allows the hierarchical DBN 122 to monitor real-time changes in patterns of the monitored signal 108 to determine whether the DUT 102 is operating properly or whether the DUT 102 potentially has unauthorized hardware (e.g., a bug) installed thereon.

The hierarchical DBN 122 can operate in different domains of time and frequency. More particularly, the hierarchical DBN 122 can contemporaneously focus on time domain analysis, spectral domain analysis and hybrid time/ frequency domain analysis to leverage measurements in the monitored signal 108, which can correspond to the RF emissions 104 or the power consumption from the power signal 106 by the DUT 102.

The hierarchical DBN 122 can include, HMMs (Hidden Markov Models) that are employable on tiers of the hierarchical DBN 122. Moreover, the hierarchical DBN 122 allows the monitored signal 108 (e.g., characterizing RF emissions or power consumption) to be represented in a probabilistic framework. This allows the integration of multiple types of measurements at a variety of frequency and time resolutions. In some examples, tiers of the hierarchical DBN 122 can be programmed to leverage different time and frequency domains with a range of resolutions by creating a tier (e.g., a module) for each of the domains. Each such tier can be programmed with specially designed algorithms for the respective domain, such that the hierarchical DBN 122 can integrate information together which results in a predictive power that is greater than the sum of the individual tiers.

In some examples, as noted, the hierarchical DBN 122 is employed to evaluate the RF emissions 104 from the DUT 102 that are characterized in the monitored signal 108. In some examples, the hierarchical DBN 122 has four tiers, but in other examples, there could be more or less tiers. The four tiers operate in concert to detect the state of the DUT 102 while the DUT 102 executes code. Each tier in the hierarchical DBN 122 executes a different DBN based machine learning algorithm. Moreover, data is passed between the tiers to reinforce and/or adapt to changing conditions. Prior to evaluating the monitored signal 108, the tiers of the multi-tier the hierarchical DBN 122 can be trained with sample data of a measured signal from a test device. The test device has the same hardware as the DUT 102. In some examples, the test device is the DUT 102, and in other examples, the DUT 102 can be a clone of the test device.

During training, the test device executes authorized code, and the monitored signal is sampled. As used herein, the term "authorized code" refers to any application, module and/or sub-module that has been authorized for execution by the test device and the DUT 102. The authorized code can include machine readable instructions for executing expected operations of the test device and DUT 102. Examples of authorized code include an operating system, original embedded code, validated applications, etc. Thus, the hierarchical DBN 122 can detect unknown unauthorized code because the features in the RF emissions differ from the models of authorized code.

Additionally, during training, the monitored signal can be sampled during times that the test device executes specific instances of known unauthorized code. Examples of unauthorized code include, but are not limited to viruses, malware, DoS attacks, etc. Stated differently, the hierarchical DBN 122 can be trained with both authorized code and unauthorized code to allow the hierarchical DBN 122 to recognize both.

The hierarchical DBN 122 includes N number of tiers, where N is an integer greater than or equal to two. Other components of the environment of operation 103, including, but not limited to external electrical components, can induce interference that is included in the monitored signal 108. Thus, the N number of tiers of the hierarchical DBN 122 (or some subset thereof) can include operations (e.g., filtering operations) to curtail the interference present in the monitored signal 61. As one example, one or more of the N number of tiers of the hierarchical DBN 122 can include a signal preconditioning operation, a signal whitening operation and/or other noise canceling operations to curtail the impact of the interference in the monitored signal 108. Additionally or alternatively, machine learning operations executed within one or more of the N number of tiers in the hierarchical DBN 122 can include operations that facilitate noise cancelation.

More particularly, the hierarchical DBN 122 include a first tier 130 that employs basic computation on frequency domain measurements to predict what application (e.g., program) the DUT 102 is executing. The hierarchical DBN 122 also includes a second tier 132 programmed to employ the knowledge of the application from the first tier and combines the knowledge of the application with frequency domain measurements to predict which module/loop of the application executed by the DUT 102. The hierarchical DBN 122 further includes a third tier 134 that executes time-domain analysis to leverage repetition in the time domain measurements of the monitored signal 108 from the DUT 102 to predict a relatively precise timing of events within each module/loop of the programing being executed by the DUT 102. Further still, the hierarchical DBN 122 includes an Nth tier 136 that executes additional time-domain analysis on the identified application, the module/loop of the application and the predicted timing of events to determine the precise control flow paths being executed by the DUT 102. In the example illustrated, the Nth tier 136 can be a fourth tier. However, in other examples, there may be intervening tiers between the operations executed by the described Nth tier 136 and the third tier 134 and/or other tiers in the hierarchical DBN 122. Additionally or alternatively, the specific operations of the Nth tier 136 (time-domain analysis on the identified application) may be different in situations where there are more or less than four tiers in the hierarchical DBN 122.

The hierarchical DBN 122 can evaluate the results of each of the first tier 130, the second tier 132, the third tier 134 and the Nth tier 136 to determine a state of the DUT 102 to predict if the DUT 102 is executing unauthorized code. In response to predicting that the DUT 102 is executing unauthorized code, the hierarchical DBN 122 can generate an alert 140 that uniquely identifies the DUT 102 and the predicted unauthorized code. In some examples, the hierarchical DBN 122 is able to identify the unauthorized code that is potentially executing on the DUT 102. In other examples, the hierarchical DBN 122 determines that the unauthorized code is unrecognized. Similarly, the hierarchical DBN 122 may generate an indication that the DUT 102 is executed unauthorized code in situations where unauthorized hardware (e.g., a bug) has been installed on the DUT 102. In some situations, the hierarchical DBN 122 can be programmed to determine that the DUT 102 is potentially executing unauthorized code in response to determining that the determined control flow paths being executed by the DUT 102 deviates from an expected pattern by more than a threshold level.

In some examples, the alert 140 can be provided to an end-user device 150. The end-user device 150 can be a computing platform, such as a desktop computer, a laptop computer, tablet computer or a smart phone. The end-user device 150 can include a display for outputting information. In some examples, the end-user device 150 can execute a client application to interface with the device monitor 116. In other examples, the end-user device 150 and the device monitor 116 can be implemented as a single, integrated device. Moreover, the end-user device 150 can include a display 152. In response to receipt of the alert 140, the end-user device 150 can output information that uniquely identifies DUT 102 and indicates that the DUT 102 is potentially executing unauthorized code.

Over time, statistical models employed by the hierarchical DBN 122 can be adapted for specific scenarios or adjusted for known alterations. For instance, in situations where the monitored signal 108 represents the RF emissions 104, the RF emissions 104 may be shifted in frequency based on a processor clock speed of the DUT 102 changing over time. However, the statistical models employed by the hierarchical DBN 122 can estimate the clock speed and then shift the modeled spectrum appropriately.

Using the framework of the hierarchical DBN 122 enables each module (including each tier of the hierarchical DBN 122) to be developed and tested independently while ensuring a unified system. Accordingly, algorithms in each module can be updated over time as advancements in machine learning are made without impacting other tiers of the hierarchical DBN 122. As one example, the second tier 132 can employ a blind source separation technique developed specifically for the frequency domain measurements to remove interference from the monitored signal 108. This allows the second tier 132 to robustly process and curtail signal interference present in the monitored signal 108 and varying noise levels while continuing to find the emission models within the data from the monitored signal 108. Further, in some examples, the third tier 134 can incorporate speech processing techniques such as time correlation and average magnitude difference function to extract repetitive signals within the time domain for precise module timing measurements. Additionally, the Nth tier 136 includes novel signal comparison techniques, such as HyperBat that specifically tailored for the time domain tracking of the monitored signal 108.

Furthermore, algorithm enhancements for each of the tiers (or some subset or superset thereof) of the hierarchical DBN 122 can be designed and implemented with a Bayesian probabilistic output that is directly adaptable to the framework of the hierarchical DBN 122. Such a hierarchical framework allows the approach to be scaled to meet a variety of needs. For example, a low-resource system that does not require fine temporal resolution could just implement the first tier 130 and the second tier 132. Conversely, a computing platform with sufficient resources could use every tier of the N tiers, of the hierarchical DBN 122. In the example illustrated operations of four tiers of the hierarchical DBN 122 are described in detail, but in some examples, there may be five or more tiers.

The hierarchical DBN 122 can be trained through semi-supervised and unsupervised learning. In the unsupervised case, the data characterizing the monitored signal can be clustered using a clustering algorithm, such as Hierarchical Density-Based Spatial Clustering of Applications and Noise (HDBSCAN) with the Earth-Mover's Distance as the metric in the frequency domain and HyperBaT in the time domain. These algorithms were demonstrated to produce the same control flow structure as the semi-supervised learning methods, where only a portion of the data is labeled (<0.1%) during the training. The primary difference between the two cases is the amount of data employed during the training procedure. Conversely, implementing the hierarchical DBN 122 as a semi-supervised machine learning allows for a-priori knowledge to be fully utilized. For example, during training, code structure 160 implemented as a control flow graph or sample code (e.g., pseudocode or code that can be compiled) of the authorized code or unauthorized code employed in the training data to generate a transition matrix employed by a HMM can be derived prior to training the hierarchical DBN 122.

Implementing the hierarchical DBN 122 also enables automated learning and inference. In particular, the hierarchical DBN 122 can be programmed to employ available data to infer models and, thus, train statistical models of the monitored signal 108 (characterizing the RF emissions 104 or the power consumption of the power signal 106) of the DUT 102 based on provided observations. For example, the hierarchical DBN 122 can employ an HMM to infer a statistical model of the observations with no expert knowledge or labels for training data. The inferred model for the hierarchical DBN 122 can be enhanced by expert knowledge of the system 100 as well.

In some examples, in response to information characterizing the alert 140, the end-user device 150 can instruct a user to inspect the DUT 102. In response, the user can inspect the DUT 102 and take corrective action, if necessary. Such corrective action can include, but is not limited to removing the DUT 102 from the environment of operation 103, clearing a memory of the DUT 102 and reinstalling authorized code, etc.

Furthermore, in some examples, the user can employ the end-user device 150 to generate an inspection report that characterizes observations and/or corrective action taken by the user. In some examples, the inspection report may include information that identifies a type of unauthorized code (e.g., virus or DoS attack). Additionally, in some situations, the inspection report could include information indicating that no unauthorized code was detected on the DUT 102. The inspection report can be provided to the hierarchical DBN 122 and used as feedback to improve the accuracy of the hierarchical DBN 122. For example, if the hierarchical DBN 122 predicts that the DUT 102 is executing unauthorized code, but the inspection report indicates that the DUT 102 is only executing authorized code, the hierarchical DBN 122 can update weights and/or parameters within the hierarchical DBN 122 to reflect the results indicated in the inspection report.

By employment of the system 100, the device monitor 116 can operate as security for the DUT 102. In particular, in situations where the DUT 102 is implemented as a relatively simple computing platform (e.g., an IoT device), the DUT 102 may lack cyber security measures to thwart or impeded access by an unauthorized user (e.g., a hacker). In such a situation, the device monitor 116 via the hierarchical DBN 122 can be employed to detect situations where an operational state of the DUT 102 has changed such that unauthorized code is potentially being executed on the DUT 102. Similarly, the hierarchical DBN 122 can be employed to detect situations where an operational state of the DUT 102 has changed such that unauthorized hardware has been installed on the DUT 102.

In view of the foregoing structural and functional features described above, example methods will be better appreciated with reference to FIGS. 3-5 and 7. While, for purposes of simplicity of explanation, the example method of FIGS. 3-5 and 7 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

Figure 3:
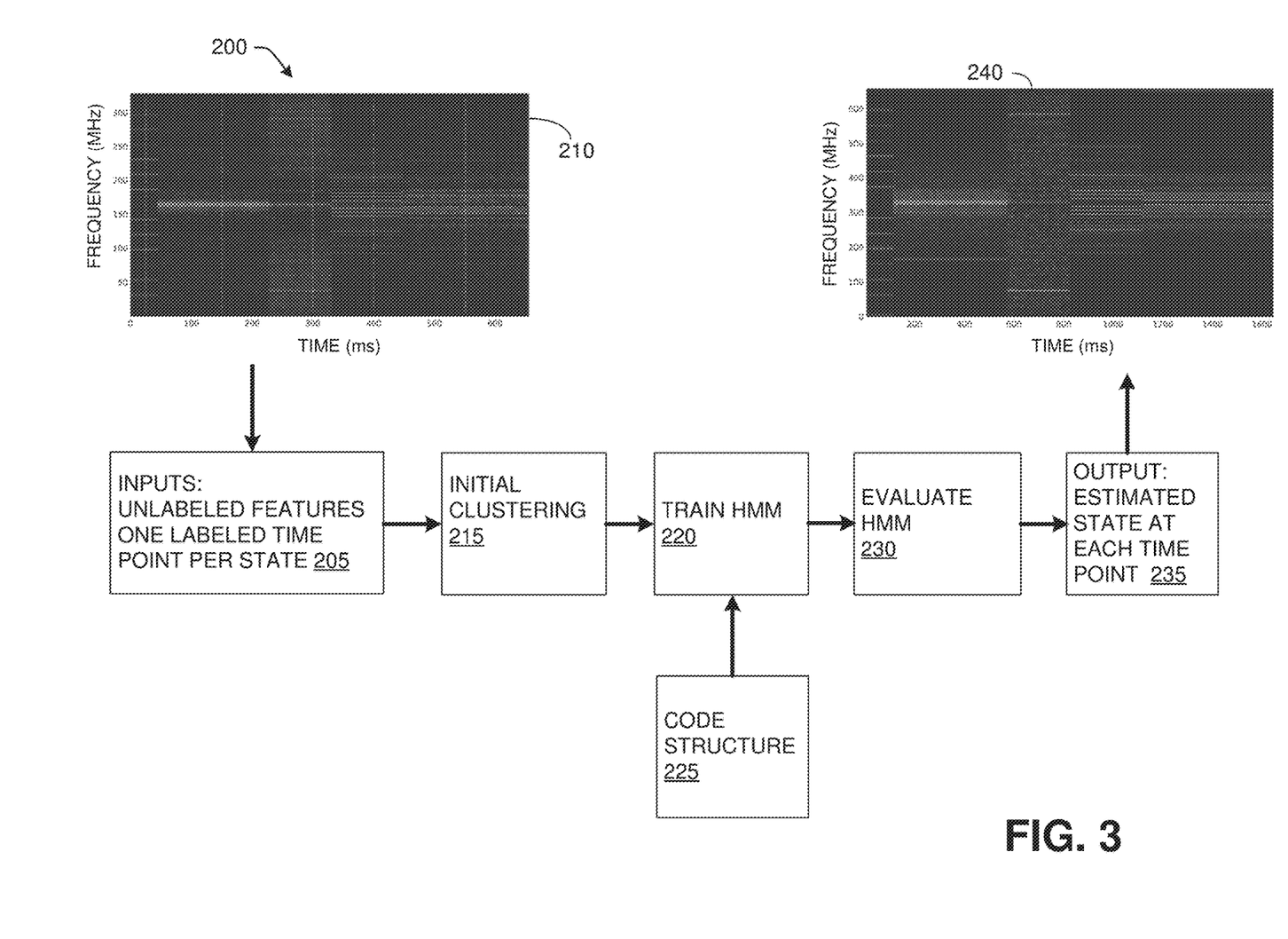
FIG. 3 illustrates an example of a flowchart for training a Hidden Markov Model (HMM) for a hierarchical Dynamic Bayesian Network (DBN).

FIG. 3 illustrates a flowchart for an example method 200 for training a semi-supervised HMM (Hidden Markov Model). The method 200 can be employed, for example, by a hierarchical DBN, such as the hierarchical DBN 122 of FIG. 2 and/or the multi-tier machine learning engine 70 of FIG. 1. More particularly, the HMM can be employed to implement the first tier 130, the second tier 132, the third tier 134 and/or the Nth tier 136 of the hierarchical DBN 122 of FIG. 2.

At 205, inputs can be received at the hierarchical DBN. A chart 210 depicts an example of data that can be embedded in the inputs. The data in the chart 210 plots signal strength of a frequency as a function of time from a test device (e.g., the DUT 102 of FIG. 2 or the DUT 52 of FIG. 1). In one example, the signal can be a measured signal from a sensor (e.g., the sensor 110 of FIG. 2 or the sensor 60 of FIG. 1) characterizing an RF signal or consumption of a power signal. The input at 205 has unlabeled features. Additionally, the input at 205 includes one (or more) labeled time points per possible state for the test device.

At 215, the hierarchical DBN executes initial clustering on the input to identify potential categories of data. At 220, the clustered input is provided to the HMM for training. Additionally, at 225, data characterizing (e.g., data characterizing flowcharts) of authorized code stored on the DUT and/or unauthorized code is provided to the HMM for training. At 230, the HMM outputs results that are compared against test data.

At 235, the HMM outputs an estimated state for each time point included in the input data. A chart 240 depicts an example of an estimated state for each time point in the input data. The estimated state can identify, for example, an application executing on the test device, a module and/or loop of the identified application and/or a timing of events within the identified module and/or loop of the identified application.

Figure 4:
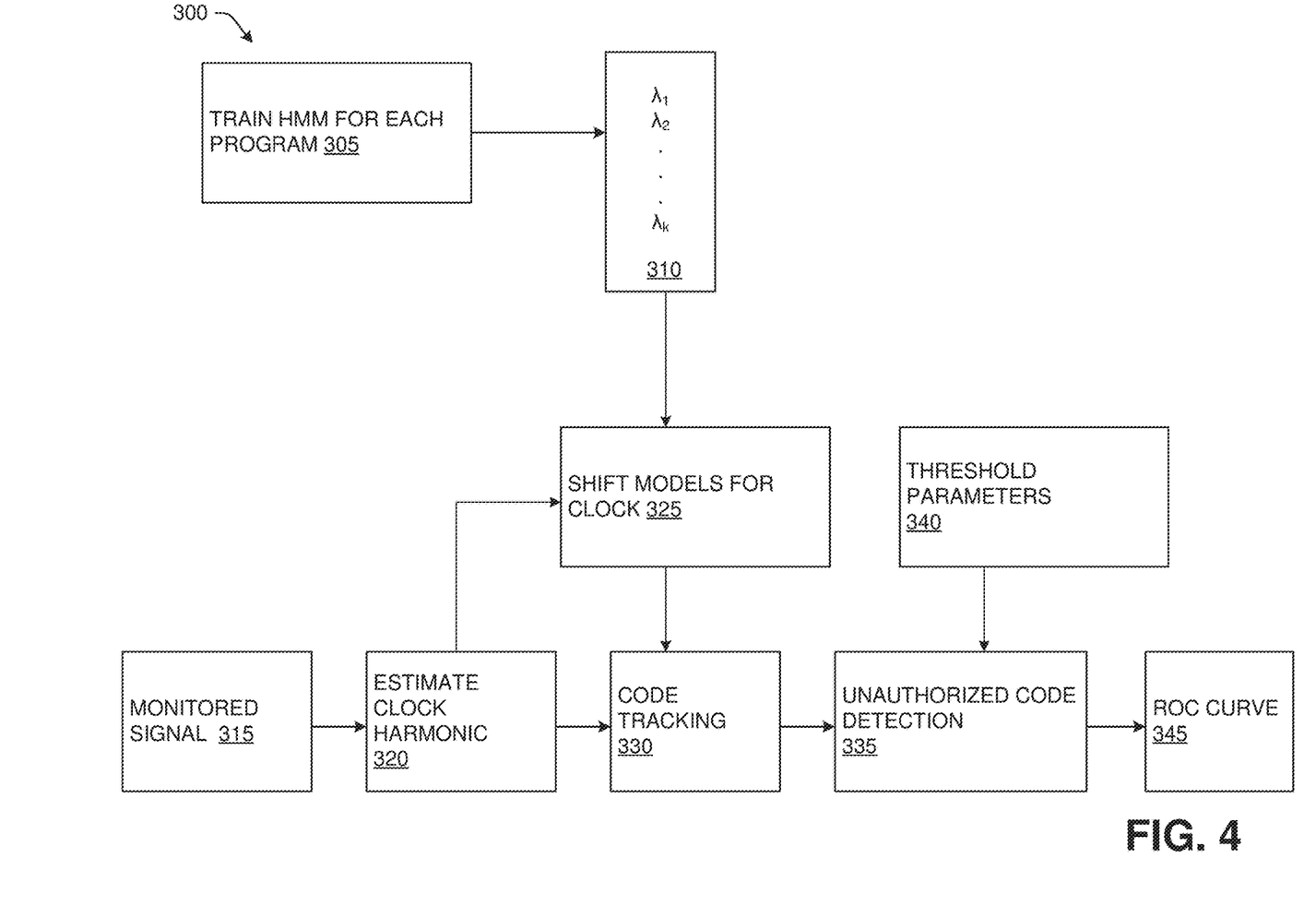
FIG. 4 illustrates a flowchart of an example method for employing a hierarchical DBN to detect unauthorized code executing on a DUT.

FIG. 4 illustrates a flowchart of an example method 300 for employing a hierarchical DBN to detect unauthorized code (e.g., a virus, malware or a DoS attack) executing on a DUT. The hierarchical DBN can be implemented as the hierarchical DBN 122 of FIG. 2 and/or the multi-tier machine learning engine 70 of FIG. 1. The DUT can be implemented as the DUT 102 of FIG. 2 and/or the DUT 52 of FIG. 1.

At 305, a trained HMM is trained for each application monitored by the hierarchical DBN to provide a set of trained HMMs. Each HMM (or some subset or superset thereof) can be trained with the method 200 of FIG. 2. An array of trained HMM (each represented as A) are provided at 310.

At 315, data characterizing a monitored signal (e.g., an RF signal or consumption of a power signal) from the DUT is provided to the hierarchical DBN. At 320, the hierarchical DBN evaluates the monitored signal to estimate a clock harmonic for the DUT. At 325, the hierarchical DBN employs the estimated clock harmonic for the DUT to shift each model of in the array of HMM to account for the estimated clock harmonic of the DUT. This shifting allows for hardware other than the DUT to be employed as a test device by accounting for manufacturing tolerances of the clock harmonic. This shifting can alternatively or additionally compensate for the clock frequency drifting over time, for example from temperature changes.

At 330, each tier of the hierarchical DBN executes code tracking on the data characterizing the monitored signal to attempt to correlate an instance of authorized or unauthorized code with a pattern in the monitored signal. The code tracking can identify, for example, an application executing on the test device, a module and/or loop of the identified application, a timing of events within the identified module and/or loop of the identified application and/or a control flow path for the identified events in the identified module and/or loop of the identified application. At 335, the hierarchical DBN generates an alert if the hierarchical DBN detects that unauthorized code is potentially executing on the DUT. The hierarchical DBN can employ a statistical threshold indicated at 340 that characterizes hardware (e.g., circuit board and/or or die) reference files that characterize the DUT. Results of the detection can be characterized in a receiver operating characteristic (ROC) curve 345.

By employment of the method 200 of FIG. 2 along with the method 300 of FIG. 3, a-priori information about authorized code and/or unauthorized code that may be executed by the DUT, as indicated by the injection of the code structure 225 of FIG. 2 employed to train each HMM. Additionally, as noted, manufacturing tolerances can cause deviation in expected emissions due to changes in clock frequency. However, the hierarchical DBN shifts models (HMMs) based on an estimate clock harmonic at 325 to account for these manufacturing tolerances.

Furthermore, the hierarchical DBN is programmed to allow data to flow in multiple directions (e.g., top-down, down-top, forward-backward and backward-forward) to allow for an extended online analysis window of the monitored signal. Further, by leveraging the code structure and/or an some operations (e.g., filtering operations), the hierarchical DBN curtails noise in the monitored signal, such that unauthorized code can be detected in the DUT without requiring shielding (e.g., a Faraday cage) surrounding the DUT.

Figure 5:
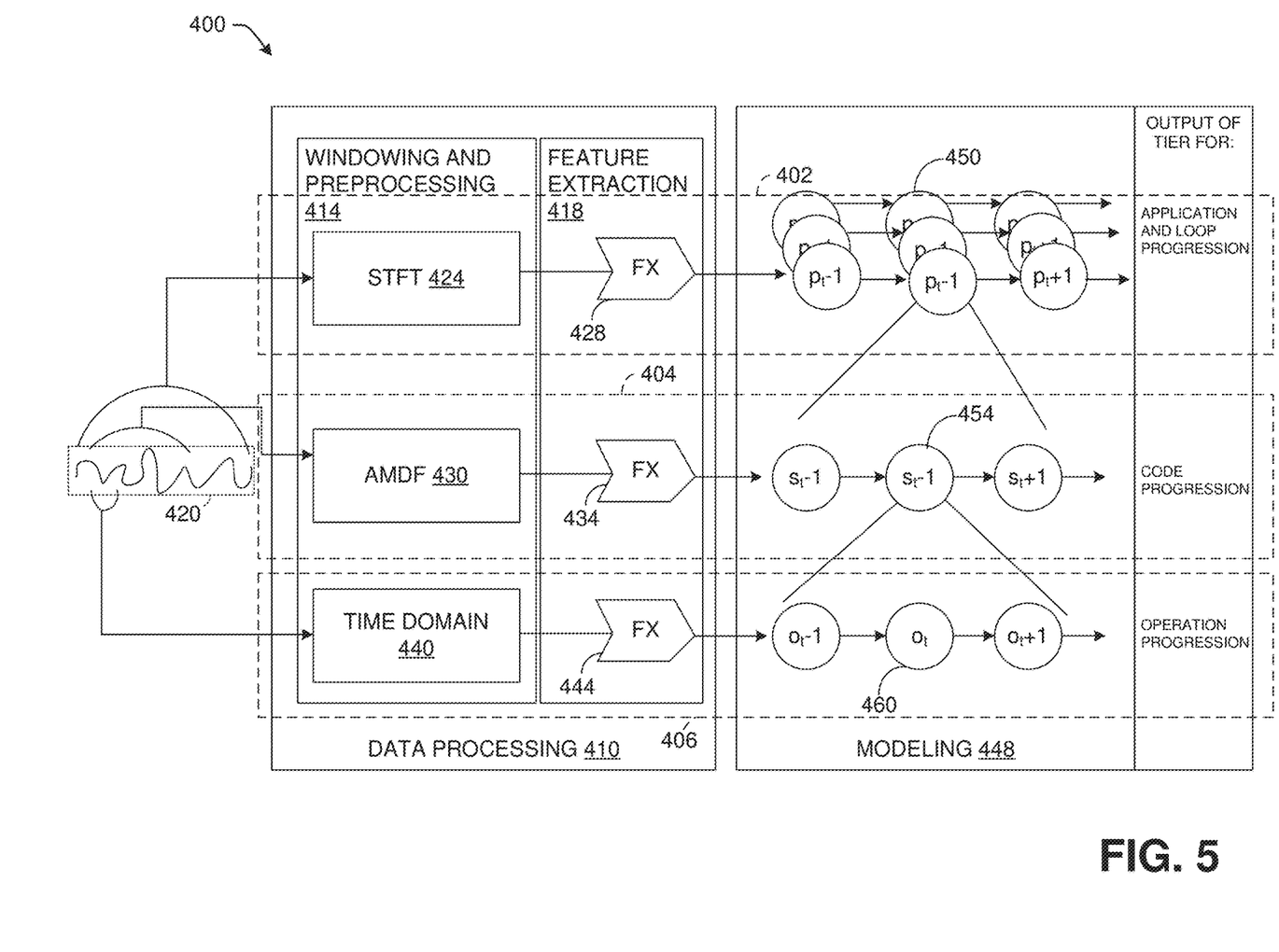
FIG. 5 illustrates a diagram depicting the flow of data within a hierarchical DBN to detect unauthorized code executing on a DUT.

FIG. 5 illustrate a diagram depicting the flow of data within a hierarchical DBN 400 to detect unauthorized code (e.g., a virus, malware or a DoS attack) executing on a DUT. The hierarchical DBN can be implemented as the hierarchical DBN 122 of FIG. 2 and/or the multi-tier machine learning engine 70 of FIG. 1. The DUT can be implemented as the DUT 102 of FIG. 2 and/or the DUT 52 of FIG. 1.

The hierarchical DBN 400 can include three, or more, tiers. In particular, the hierarchical DBN 400 can include a first tier 402 can be employed to implement the first tier 130 and/or the second tier 132 of the hierarchical DBN 122 of FIG. 2. The hierarchical DBN 400 can also include a second tier 404 that can be employed to implement the third tier 132 of FIG. 2. Further, the hierarchical DBN 400 can include a third tier 406. In some examples, the third tier 406 can implement the Nth tier 136 of FIG. 2.

The hierarchical DBN 400 can include a data processing layer 410. The data processing layer 410 can include a windowing and preprocessing sub-layer 414 and feature extraction sub-layer 418. Additionally, a monitored signal 420 can be provided to the data processing layer 410.

The first tier 402 processes a timeframe (e.g., about 40 milliseconds to 1 second) of the monitored signal 420. The first tier 402 includes short-time Fourier transform (STFT) 424 operating in the windowing and preprocessing sub-layer 414 to filter the monitored signal 420 and to transform the monitored signal into the frequency domain. The STFT is employed to determine the sinusoidal frequency and phase content of local sections of the monitored signal 420 as the monitored signal 420 changes over time. The STFT 424 can divide the monitored signal into shorter segments of equal length and then compute a Fourier transform separately on each shorter segment to reveal the Fourier spectrum on each shorter segment. The output of the STFT 424 is provided to a feature extractor 428 of the feature extraction sub-layer 418 in the first tier 402. The feature extractor 428 extracts predefined features of the output of the STFT 424.

Contemporaneously, the second tier 404 process a sub-timeframe of the monitored signal. The sub-timeframe can be less than the timeframe monitored by the first tier 402. As one example operation, the second tier 404 can include an average magnitude difference function (AMDF) that employs speech processing techniques to compare segments of the monitored signal 420 (that includes an interference signal) with other segments offset by a trial period to find a match. In other examples, other functions and/or algorithms are employable for the second tier 404. Moreover, the AMDF 430 can operate near the time-domain. The output of the AMDF 430 is provided to a feature extractor 434 of the feature extraction sub-layer 418 in the second tier 404. The feature extractor 434 extracts predefined features of the output of the AMDF 430.

In another contemporaneous operation, the third tier 406 process a sub-timeframe of the monitored signal. The sub-timeframe can be less than the timeframe monitored by the second tier 404 and the first tier 402. The third tier 406 includes time domain operations 440. The time domain operations 440 can evaluate a process a relatively small segment of the monitored signal 420 to curtail interference that may be present in the monitored signal 420. The output of the time domain operations 440 is provided to a feature extractor 444 of the feature extraction sub-layer 418 in the third tier 406. The feature extractor 444 extracts predefined features of the output of the time domain operations 440.

A modeling layer 448 of the hierarchical DBN 400 can include tiers of DBNs that can operate in concert. Moreover, data can flow between the tiers of the hierarchical DBN 400 within the modeling layer 448.

The output of the feature extractor 428 in the first tier 402 is provided to a first HMM 450 of the hierarchical DBN 400. The first HMM 450 can represent a plurality of HMMs that executes spectral analysis of the monitored signal 420 in the frequency domain. More particularly, the first HMM 450 is configured to employ frequency domain analysis on the feature set extracted of the monitored signal 420 extracted by the feature extractor 428 to identify an application executing on the computing platform. Additionally, in some examples, the first HMM 450 can identify a module of the identified application, loops and/or loop progression within the identified application.

The output of the feature extractor 434 in the first tier 402 is provided to a second HMM 454 of the hierarchical DBN 400. The second HMM 454 is configured to employ time domain analysis on the feature set extracted of the monitored signal 420 extracted by the feature extractor 434 to identify an application executing on the computing platform. Additionally, in some examples, the first HMM 450 can identify code progression that characterizes timing of events within the identified module and/or loop of the identified application.

The output of the feature extractor 444 in the third tier 406 is provided to a third HMM 460 of the hierarchical DBN 400. The third HMM 460 is configured to determine operation progression within the identified module and/or loop of the identified application. More particularly, the third HMM 460 can employ time domain analysis on the feature set extracted of the monitored signal 420 extracted by the feature extractor 444 to determine control flow paths within the timing of events the identified module and/or loop of the identified application being executed by the DUT.

Outputs for the modeling layer 448 can be examined to determine whether the DUT that provided the monitored signal 420 potentially has unauthorized code executing thereon. In such a situation, an alert can be generated in a manner described herein.

Figure 6:
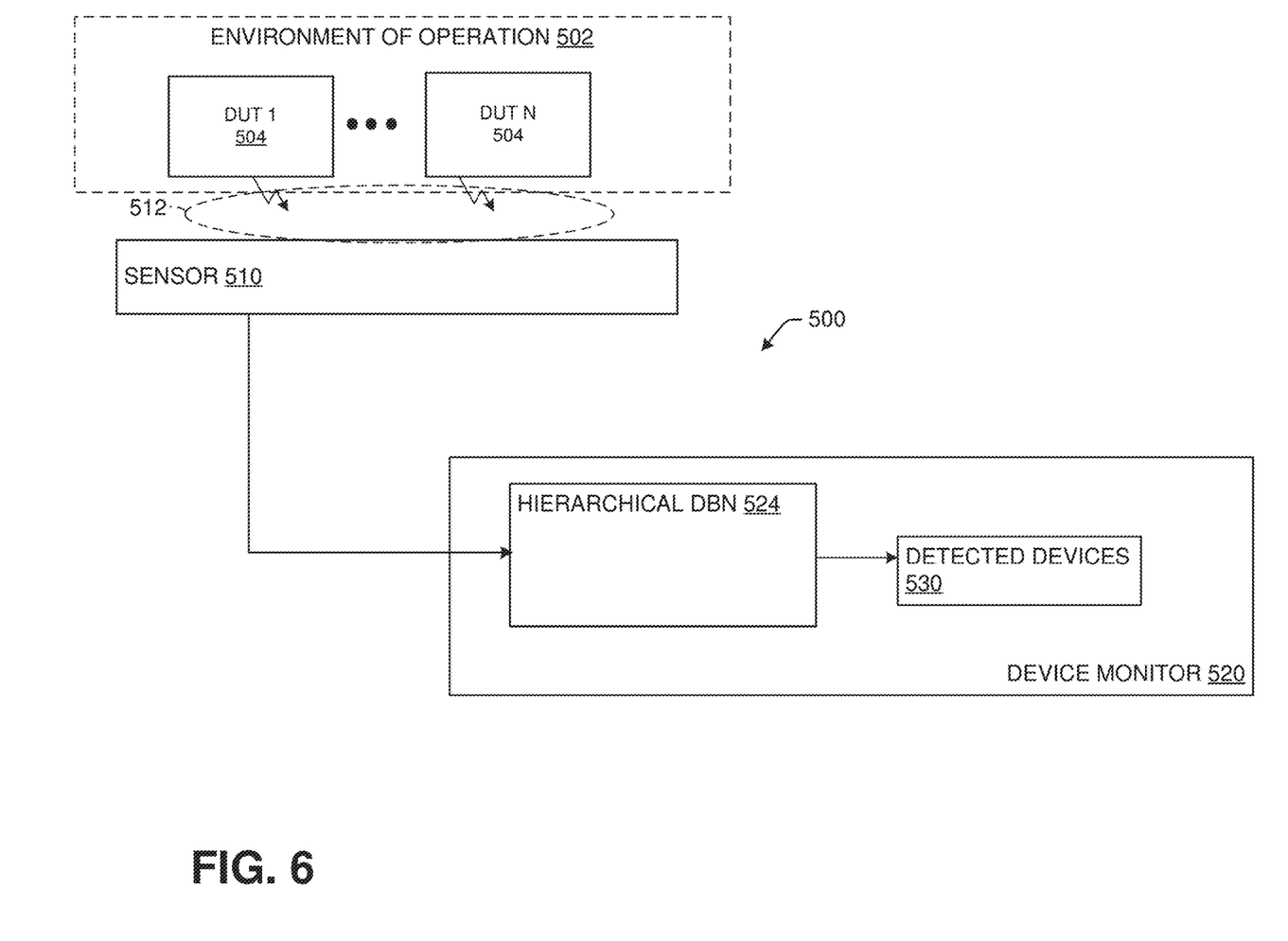
FIG. 6 illustrates a diagram of an example system for identifying particular types of hardware for multiple DUTs operating in an environment of operation.

FIG. 6 illustrates a diagram of an example system 500 for identifying particular types of hardware in an environment of operation 502. The environment of operation can include N number of DUTs 504, where N is an integer greater than one (e.g., a plurality of computing platforms). In such a situation, each of the DUTs 504 can be computing platforms, such as mobile devices (e.g., smart phones, tablet computers, laptop computers, etc.) or desktop devices (e.g., a desktop computer, a server, etc.). Additionally, in some examples, the DUTs 504 may be different types of the computing platforms. For instance, the first DUT 504 (DUT 1) may be a smart phone and the Nth DUT 504 (DUT N) may be a tablet computer.

The system 500 includes a sensor 510 that can monitor RF signals emitted by the N number of DUTs 504, indicated as a monitored signal 512. The sensor 510 can provide data (e.g., raw data) characterizing the monitored signal 512 to a device monitor 520. The device monitor 520 can be implemented with a computing platform similar to the device monitor 62 of FIG. 1 and/or the device monitor 116 of FIG. 2. The device monitor 520 and the sensor 510 can be air-gapped from the N number of DUTs 504.

The device monitor 520 can include a hierarchical DBN 524 that can analyze the data characterizing the monitored signal 512 to identify the hardware of the N number of DUTs 504, or some subset thereof. The hierarchical DBN 524 can be implemented in a manner similar to the hierarchical DBN 122 of FIG. 2. Thus, the hierarchical DBN 524 can process multiple concurrent RF emissions to identify an RF signature of each of the N number of DUTs 504 (or some subset thereof). The RF signature can be matched with a known signature of a similar computing platform to identify each instance of the similar computing platform. The hierarchical DBN 524 can output a list of detected devices 530. In some examples, the list of detected devices can also include information identifying software executing on a respective device (e.g., an operating system).

In some examples, by employing the system 500, the sensor 510 can be placed in an inconspicuous location, and the sensor 510 can provide the device monitor with the data characterizing the monitored signal 512 via a network. In such a situation, the hierarchical DBN 524 can identify the number and type of the N number of DUTs 504 (or some subset thereof). For instance, in one such scenario, the hierarchical DBN 524 might determine that the first DUT 504 is a particular model iPhone executing a particular version of iOS. In this same scenario, the hierarchical DBN 524 might determine that the Nth DUT 504 is a particular model tablet computer executing a particular version of the Android operating system. Accordingly, the hierarchical DBN 524 can be employed to identify the types of hardware employed to implement the DUTs 504 without requiring direct communication with any of the N number of DUTs 504.

Figure 7:
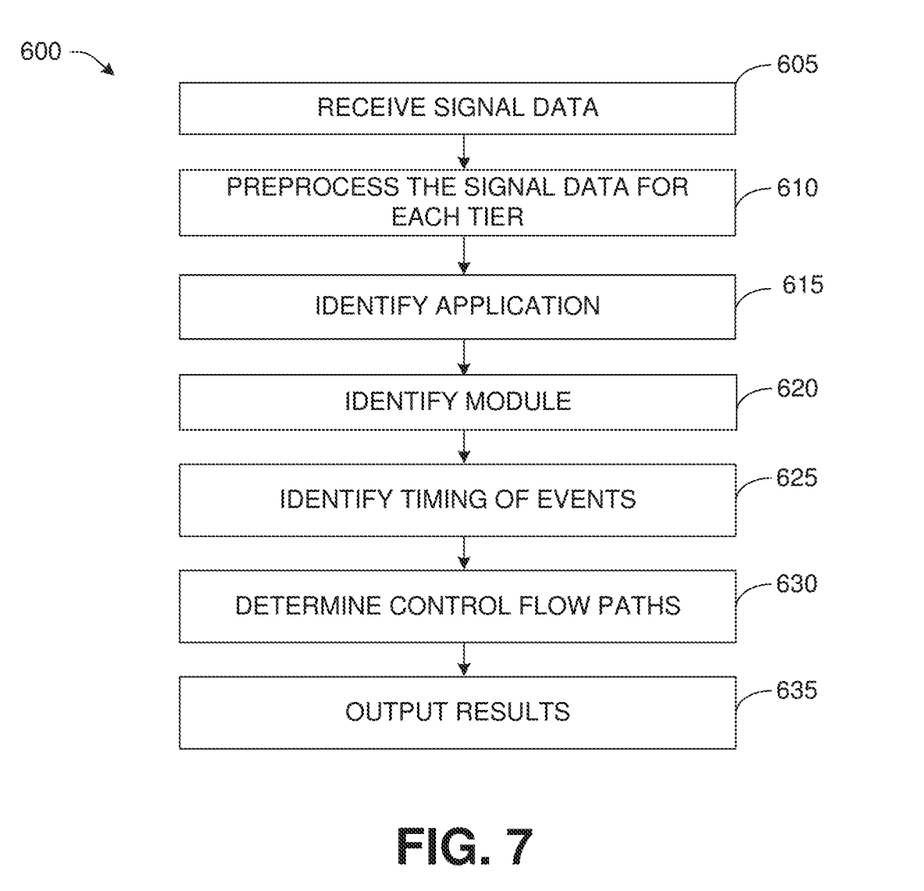
FIG. 7 illustrates an example of a method 600 for monitoring operations of a DUT or multiple DUTs.

FIG. 7 illustrates an example of a method 600 for monitoring operations of a DUT or multiple DUTs. The method 600 can be implemented, for example, with the device monitor 62 of FIG. 1, the device monitor 116 of FIG. 2 and/or the device monitor 520 of FIG. 6. At 605 a hierarchical DBN (e.g., the hierarchical DBN 122 of FIG. 1 and/or the hierarchical DBN 524 of FIG. 6 can receive signal data characterizing a monitored signal of the computing platform and an interference signal. At 610, the hierarchical DBN can preprocess, by a plurality of tiers of the multi-tier machine learning engine, the signal data in a manner described with respect to 410 of FIG. 5.

At 615, a first tier (e.g., the first tier 402 of FIG. 5) the hierarchical DBN can execute frequency domain analysis on the signal data to identify an application executing on the computing platform. At 620, the first tier (e.g., also the first tier 402 of FIG. 5) of the hierarchical DBN can also execute frequency domain analysis on the signal data to identify a module and/or loop of an identified application executing on the computing platform. At 625, a second tier (e.g., the second tier 404 of FIG. 5) can employ time domain analysis to identifying timing of events within an identified module and/or loop of the identified application. At 625, a third tier (e.g., the third tier 406 of FIG. 5) can employ time domain analysis to determine control flow paths being executed by the corresponding DUT. At 635, results of the hierarchical DBN can be output. Such results can indicate, for example that one or more of the DUTs is executing unauthorized code (e.g., through an alert). Alternatively, the results can include a list of hardware employed to implement the one or more DUTs and/or software (e.g. an operating system) executing on the corresponding DUT.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system for monitoring operations of a computing platform comprising:
   a non-transitory memory for storing machine readable instructions; and
   a processing unit that accesses the memory and executes the machine readable instructions, the machine readable instructions comprising:
      a multi-tier machine learning engine that receives signal data characterizing a monitored signal of the computing platform, the machine learning engine comprising:
         a plurality of tiers that employ frequency domain analysis on the signal data to identify an application executing on the computing platform and a module and/or loop of the identified application and employ time domain analysis on the signal data to identify timing of events within the identified module and/or loop of the identified application, wherein a number of tiers executed by the multi-tier machine learning algorithm is selected based on resources allocated to the system, and each tier in the plurality of tiers the multi-tier machine learning algorithm executes a corresponding machine learning algorithm that is trained independently.

2. The system of claim 1, wherein the plurality of tiers of the multi-tier machine learning engine further employ the identified timing of the events to determine control flow paths being executed by the computing platform.

3. The system of claim 1, wherein the monitored signal is one of radio frequency (RF) emissions from the computing platform and consumption of a power signal consumed by the computing platform.

4. The system of claim 1, wherein the computing platform is an Internet of Things (IoT) device, the IoT device comprising:
   a memory that stores machine readable instructions; and
   a processing unit that accesses the memory and execute the machine readable instructions.

5. The system of claim 1, wherein at least one tier of the plurality of tiers comprises a machine learning model trained with data characterizing code structure of at least one of authorized code and unauthorized code executable by the computing platform.

6. The system of claim 1, wherein the signal data characterizing the monitored signal is provided from a sensor, wherein the system is air gapped from the computing platform.

7. The system of claim 6, wherein the sensor receives an interference signal generated by a device separate from the computing platform and each tier in the plurality of tiers of the multi-tier machine learning engine comprises operations to curtail the interference signal.

8. The system of claim 7, wherein the operations of a first tier of the plurality of tiers in the multi-tier machine learning engine comprises a short-time Fourier transform (STFT) that determines a sinusoidal frequency and phase content of local sections of the monitored signal as the sinusoidal frequency and phase content changes over time.

9. The system of claim 8, wherein a second tier of the plurality of tiers in the multi-tier machine learning engine comprises an average magnitude difference function (AMDF) that compares segments of the monitored signal with other segments offset by a trial period to find a match.

10. The system of claim 1, wherein the multi-tier machine learning engine comprises a hierarchical Dynamic Bayesian Network (DBN).

11. The system of claim 10, wherein the hierarchical DBN receives data characterizing a flow chart of a given application stored on the computing platform.

12. The system of claim 11, wherein each tier in the plurality of tiers of the hierarchical DBN employs the data characterizing flow of the given application to correlate the monitored signal with the flow of the given application.

13. The system of claim 11, wherein a given tier in the plurality of tiers of the hierarchical DBN employs hyperdimensional Bayesian time mapping to correlate the monitored signal with the flow of the given application.

14. The system of claim 1, wherein the computing platform comprises a plurality of computing platforms, and the multi-tier machine learning engine identifies hardware for at least a subset of the plurality of computing platforms.

15. The system of claim 1, wherein the multi-tier machine learning engine generates an alert indicating that the computing platform is potentially executing malicious code in response to determining that the determined control flow paths being executed by the computing platform deviates from an expected pattern by more than a threshold level.

16. A non-transitory machine readable medium having machine executable instructions, the machine executable instructions comprising:
a hierarchical dynamic Bayesian network (DBN) that receives signal data characterizing a monitored signal of a computing platform, and an interference signal generated by a device separate from the computing platform, the hierarchical DBN comprising:
a first tier that employs frequency domain analysis on the signal data to identify an application executing on the computing platform;
a second tier that employs frequency domain analysis on the signal data to identify a module and/or loop of the identified application;
a third tier that employs time domain analysis on the signal data to identify timing of events within the identified module and/or loop of the identified application; and
a fourth tier that employs the identified timing of the events to determine control flow paths being executed by the computing platform;
wherein the first tier, the second tier and the third tier each comprises operations to curtail the interference signal from the signal data.

17. The non-transitory medium of claim 16, wherein the monitored signal is a radio frequency (RF) signal emanating from the computing platform and the signal data is provided from a sensor is air gapped from the computing platform.

18. A method comprising:
receiving, at a multi-tier machine learning engine, signal data characterizing a monitored signal of a computing platform and an interference signal, wherein the monitored signal and the interference signal are detected by a sensor air gapped from the computing device, such that the sensor and the computing device are physically and logically separated, and the monitored signal is one of radio frequency (RF) emissions and consumption of a power signal consumed by the computing platform;
preprocessing, by a plurality of tiers of the multi-tier machine learning engine, the signal data;
executing frequency domain analysis on the signal data to identify a module and/or loop of an identified application executing on the computing platform; and
identifying timing of events within an identified module and/or loop of the identified application.

19. The method of claim 18, wherein at least one tier of the multi-tier machine learning engine employs time domain analysis on the signal data.

\* \* \* \* \*